3,692,542
SOFT CANDY CONTAINING CONFECTIONERY
SYRUP
Raoul Guillaume Phillipe Walon, Brussels, Belgium,
assignor to CPC International Inc.
No Drawing. Filed Aug. 17, 1970, Ser. No. 64,637
Int. Cl. A23g 3/00
U.S. Cl. 99—134 R          6 Claims

ABSTRACT OF THE DISCLOSURE

Soft candies which include fat, a flavoring agent, an emulsifier and a syrup, said syrup is characterized as having a D.E. less than 60, a levulose content of 3–16%, a dextrose content of 10–35%, a maltose content of 10–25%, and 40–60% of oligosaccharides having a degree of polymerization of 6 and higher, said percentages based on total carbohydrate solids present.

---

In making a confectionery-like soft candy, sucrose is generally utilized as the sweetening agent. An additional source of sugar, such as dextrose or maltose, is usually also employed to give taste balance and lessen the high sweetening power of sucrose to some extent. The primary drawback in use of sucrose is its high cost relative to other sugars which could be used if suitable. Also, it is somewhat of a drawback to be compelled to combine a number of sources of sweetening agents to constitute an overall combination of sugars which will be acceptable in making a wide variety of confectioneries. Lastly, sucrose has a tendency to crystallize when used in a confection, thus causing an undesirable "graining" effect.

It would be a distinct advance in the art if a source of sugars could be made such as in the form of a syrup which does not include sucrose, and could be used in making a wide variety of confectioneries, such as soft candies, including toffees, carmels, etc. If such a syrup could be conveniently made, at the requisite desired sweetness, and yet had a high solids content, say in the neighborhood of 80% and did not tend to crystallize, such a syrup would be readily marketable and widely sought. Again, if a confectionery, such as a soft candy, could be made from such a syrup, which candy did not collapse due to excessive hygroscopicity, and on the other hand did not harden due to loss of moisture, such a candy would have the sought-after utility and proper constituency desired by the consumer.

In view of the above, it therefore becomes an object of the invention to provide a new and improved syrup useful as the sweetening agent in a confectionery.

Another object of the invention is to provide the above syrup which can be usefully constituted into a confectionery, and yet does not contain sucrose as a necessary ingredient.

A further object of the invention is to provide a confectionery, such as a soft candy, which contains the above syrup and other ingredients normally employed. Such candies are particularly characterized as non-hardening and non-collapsing due to the novel make-up and properties of the syrup used.

A still further object of the invention is to provide a syrup of the type described which may be used in a wide variety of confectioneries with equal facility.

Yet another object of the invention is to provide a syrup which may be successfully formulated with a wide variety of fats, flavoring agents, emulsifiers, etc. to produce confectioneries of diverse types.

Other objects will appear hereinafter.

In accordance with the invention, I have found a unique confectionery syrup which has an acceptable sweetness, and when used in making confectioneries like candies maintains proper moisture balance, that is, either hardens due to loss of water or becomes exceedingly soft due to excessive moisture pick-up.

The syrup that I have discovered may be generally described in terms of its various sugar constituents. Broadly speaking, the syrup composition has a D.E. less than 60, a levulose content of 3–16%, a dextrose content of 10–35%, a maltose content of 10–25%, and 40–60% of oligosaccharides having a degree of polymerization of 6 or higher ($DP_{6+}$), said percentages being based on total carbohydrate solids present.

Preferred syrup compositions have a D.E. of less than 55, a levulose content of 4–12%, a dextrose content of 10–30%, a maltose content of 10–20%, and 40–60% of oligosaccharides having a degree of polymerization of 6 or above.

The term D.E. or "dextrose equivalent" is used herein to refer to the reducing sugars content of the dissolved solids in a starch hydrolysate expressed as dextrose as measured by the Luff-Schoorl Method (NBS Circular C–440, p. 195 as appearing in "Polarimetry, Saccharimetry and Sugars." Authors: Frederick J. Bates and Assoc.).

The above described syrups may be made by a wide variety of methods. For example, by properly manipulating conditions by judicious use of enzymes and/or acids, starch substrates may be directly converted into syrups having the above defined ranges of special constituents. Likewise, a number of various starch syrups available on the market or which may be made by various techniques may be combined in the proper proportions to produce syrups described herein.

One excellent way of forming the syrups of the invention is to blend a combination of two or three syrups which have been produced by varying techniques of starch conversion. The first syrup used in the blend may be described as a high maltose syrup. One way of producing a syrup of this type is to first acid thin the starch slurry, and follow this step by malt saccharification, and glucamylase saccharification steps. In one run, a high maltose syrup was produced having the following make-up:

SYRUP I.—HIGH MALTOSE SYRUP

| Sugar component: | Percent by weight |
| --- | --- |
| D.E. | 37.6 |
| Levulose | --- |
| $DP_1$ | 4.8 |
| $DP_2$ | 25.0 |
| $DP_3$ | 9.8 |
| $DP_4$ | 7.0 |
| $DP_5$ | 6.5 |
| $DP_{6+}$ | 32.5 |

Another syrup used as a portion of the blend to make the syrups defined here may be described as a low D.E., high oligosaccharide syrup, that is, one having a high proportion of $DP_{6+}$ oligosaccharides. One method of making a syrup of this type, also known as a dextrin syrup, is carried out by converting starch with malt distase, a mixture of alpha and beta amylases. Another suitable method of preparing a syrup of this type is effected by either acid thinning a starch slurry, or by thinning a starch slurry with a bacterial alpha-amylase. In one run, a syrup of this type was produced having the following components:

SYRUP II.—DEXTRIN SYRUP

| Sugar component: | Percent by weight |
| --- | --- |
| D.E. | 19.8 |
| Levulose | --- |
| $DP_1$ | 4.8 |
| $DP_2$ | 8.8 |
| $DP_3$ | 6.2 |
| $DP_4$ | 4.4 |
| $DP_5$ | 3.8 |
| $DP_{6+}$ | 72.0 |

A further syrup used here as a portion of a blend to make the finally sought-after syrup was one high in levulose. Here, a high D.E., high dextrose material is first made in the conventional way, say by acid thinning a starch slurry followed by enzymatic conversion with bacterial glucamylase. A portion of the dextrose present was then interconverted by known means, such as by ion exchange methods or by base conversion. One typical high levulose syrup is constituted as follows:

SYRUP III.—HIGH LEVULOSE SYRUP

| Sugar component: | Percent by weight |
| --- | --- |
| D.E. | 89.7 |
| Levulose | 21.4 |
| $DP_1$ | 68.0 |
| $DP_2$ | 7.2 |
| $DP_3$ | 1.0 |
| $DP_4$ | 1.1 |
| $DP_5$ | 1.2 |
| $DP_6$ | 1.1 |
| $DP_{7+}$ | --- |

Various blends of the foregoing were made by manipulating the ratios of one to another. In some instances, only two of the three syrups were combined, while in others all three were in a number of varying proportions.

The following blends of the above syrups yielded a number of compositions having ingredients falling within the ranges set out above. These syrups were made as follows:

SYRUP A

| Syrup No.: | Percent by weight |
| --- | --- |
| I | 25.0 |
| II | 50.0 |
| III | 25.0 |

SYRUP B

| Syrup No.: | Percent by weight |
| --- | --- |
| I | 20.0 |
| II | 50.0 |
| III | 30.0 |

SYRUP C

| Syrup No.: | Percent by weight |
| --- | --- |
| I | 10.0 |
| II | 75.0 |
| III | 15.0 |

The syrups of the invention may be used in preparing a wide number of confections, such as coatings for candies, cookies, biscuits, and cereals, as confections for direct consumption as fragmented chips for baked goods, desserts, and other food items, as spreads, butters, and icings, etc. Further, they may be used in making gum drops, jelly beans, "autumn leaves," turkish paste, orange- lemon- and pineapple-flavored slices, etc. Still further they may be combined with a fat and used for example in chocolate, as chocolate-like coatings for candy, in ice cream, and cookies, and in other confections, such as toffees, caramels, etc. and in icings, fillings, fudges, butter creams, and other compositions of this class. The syrups defined herein are particularly useful in preparing soft candies such as toffees and the like. In particular, use of syrups in making confections of this type results in a candy having the proper body, moisture, and other factors desired in candies of this type. Syrups of the aforementioned constitution having sugar ingredients within the closely defined ranges have been especially successfully used in making soft candies which neither pick up excessive water, nor harden through unwanted evaporation.

In one series of experiments it was determined that the levulose content should fall within the above range, since a syrup containing levulose substantially above this range when used in making a soft candy results in a candy which tends to collapse. That is, the candy upon storage liquifies by picking up extreme amounts of moisture. On the other hand, a syrup containing less levulose than the minimum content defined above is not sufficiently sweet. Thus, the levulose content of the overall syrup is particularly important in terms of making a proper syrup to be used in preparing soft candies.

Depending upon the particular confection to be prepared, the syrups of the invention may be combined with a wide variety of edible substances to make confections of diverse types. For example, the syrups may be combined with a fat, such as a partially or completely hydrogenated soybean oil, cottonseed oil, coconut oil, and blends thereof. Again, the syrups may be formulated with non-fat milk solids which may be chosen from a variety of known materials of this type including whey, casein, and comparable materials within this class.

Usually an emulsifier is also present in preparing the confectionery. Thus, fatty acid glycerides, propylene glycol fatty acid esters, water-soluble and water-dispersible emulsifiers containing polyoxyethylene chains, such as the partial fatty acid esters of polyhydric alcohols containing at least one polyoxyethylene chain may be used as emulsifiers. Other emulsifiers include partial fatty acid esters of polyoxyethylene glycol and complete fatty acid esters of polyoxyethylene glycol, and like materials. Specific examples of this type are the partial fatty acid esters of polyoxyethylene sorbitan such as the polyoxyethylene sorbitan monostearate. Other suitable emulsifiers which may be used in conjunction with the syrups of the invention include glyceryl esters, such as the glyceryl monooleate, diacetyl tartaric acid esters of mono- and diglycerides of fat-forming fatty acids, commercial soybean lecithin, split lecithins, and like emulsifiers.

Additional ingredients may also be employed supplemental to the fat, syrup and emulsifier, such as small amounts of carbohydrate materials. These materials have a bodying and water-binding effect. Typical of these are gums, carboxy methyl cellulose, starches, algin, sodium alginate, or refined hydrocolloids that come from sea plants, mainly Irish moss or carrageen.

Still further materials may be present in making confections of various types, such as vitamins, minerals, flavoring agents, dyes, colorants, citric acids, fumaric acid, etc. Specific flavorants include chocolate liquor, cocoa, strawberry, vanilla, caramel, mint, butter, maple, spice and the like.

The following illustrates preparation of several types of soft candies involving a number of syrups having ingredients falling within the aforementioned ranges. Specifically, a number of syrups of the invention can be made by blending a number of different types of syrups as described above. Exemplary syrups have the following sugar composition:

SYRUP IV

| Sugar component: | Percent by weight |
| --- | --- |
| Levulose | 5.3 |
| Dextrose | 20.6 |
| Maltose | 16.2 |
| $DP_{6+}$ | 44.8 |

SYRUP V

| Sugar component: | Percent by weight |
|---|---|
| Levulose | 6.4 |
| Dextrose | 23.8 |
| Maltose | 14.6 |
| $DP_{6+}$ | 42.8 |

SYRUP VI

| Sugar component: | Percent by weight |
|---|---|
| Levulose | 3.2 |
| Dextrose | 14.1 |
| Maltose | 11.7 |
| $DP_{6+}$ | 57.4 |

The above syrups were combined with fat emulsifiers and flavoring to produce soft candies as follows:

CANDY NO. I

| Ingredients: | | Amount |
|---|---|---|
| Milk | kg | 2.5 |
| Fat | kg | 0.5 |
| Glyceryl monostearate | gr | 45.0 |
| Salt | gr | 37.0 |
| Vanilla | gr | 4.0 |
| Syrup IV | kg | 7.25 |

The above candy is prepared in the following manner. The syrup is gently heated and the condensed sweetened milk added thereto. Thereafter, the fat and salt are added, followed by addition of the glyceryl monostearate. When the temperature reaches 110° C., vanilla is added, and then the temperature is raised to 130° C. The candy has good taste and particularly has a sweetness level which is more pleasant than that possessed by toffees currently on the market. The candies do not collapse, and maintain proper moisture content, neither hardening through loss of moisture or becoming excessively soft due to excessive moisture absorption.

CANDY NO. II

| Ingredients: | | Amount |
|---|---|---|
| Milk | kg | 2.5 |
| Fat | kg | 0.5 |
| Glyceryl monostearate | gr | 45.0 |
| Salt | gr | 37.0 |
| Vanilla | gr | 4.0 |
| Syrup V | kg | 7.25 |

This candy is prepared as described above with the exception that it is cooked to 125° C.

CANDY NO. III

| Ingredients: | | Amount |
|---|---|---|
| Milk | kg | 2.5 |
| Fat | kg | 0.5 |
| Glyceryl monostearate | gr | 45.0 |
| Salt | gr | 37.0 |
| Vanilla | gr | 4.0 |
| Syrup VI | kg | 7.25 |

Again, this candy is prepared as described above.

It has been determined that in order to make excellent candies which maintained proper qualities over exceedingly long periods of standing time, a gum such as a gelatin should be added in preparing the candies. The following typify this embodiment of the invention.

CANDY NO. IV

| Ingredients: | | Amount |
|---|---|---|
| Milk | kg | 2.5 |
| Fat | kg | 0.5 |
| Glyceryl monostearate | gr | 45.0 |
| Salt | gr | 37.0 |
| Vanilla | gr | 4.0 |
| Syrup VI | kg | 7.25 |
| Gelatin | gr | 100.0 |

This candy is prepared essentially as described above.

It should be understood, of course, that while one primary utility of the syrups of the invention is found in their use in making soft candies, they nevertheless may be used in making a wide variety of confectioneries of the types described above and others.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention is hereby claimed as follows:

I claim:

1. A soft candy that is particularly characterized as being substantially non-hardening and non-collapsing, that comprises a fat component, a flavoring agent, an edible emulsifier, and a syrup that has a D.E. less than 60, a levulose content of from 3% to 16%, a dextrose content of from 10% to 35%, a maltose content of from 10% to 25%, and from 40% to 60% of oligosaccharides that have a degree of polymerization of 6 and higher, said percentages being based on total carbohydrate solids present in the syrup.

2. A candy in accordance with claim 1 that also includes a gum.

3. A candy in accordance with claim 2 wherein the gum is gelatin.

4. A soft candy that is particularly characterized as being substantially non-hardening and non-collapsing, that comprises a fat component, a flavoring agent, an edible emulsifiers, and a syrup having a D.E. less than 55, a levulose content of from 4% to 12%, a dextrose content of from 10% to 30%, a maltose content of from 10% to 20%, and from 40% to 60% of oligosaccharides having a degree of polymerization of 6 and higher, the percentages being based on total carbohydrate solids present in the syrup.

5. A candy in accordance with claim 4 that also comprises non-fat milk solids.

6. A candy in accordance with claim 4 that also includes a gum.

References Cited

UNITED STATES PATENTS

| 3,285,776 | 11/1966 | Scallet et al. | 99—142 |
| 3,335,013 | 8/1967 | Wolfmeyer | 99—142 |

A. LOUIS MONACELL, Primary Examiner

J. M. HUNTER, Assistant Examiner

U.S. Cl. X.R.

99—142